United States Patent
Fukai

(10) Patent No.: US 12,427,891 B2
(45) Date of Patent: Sep. 30, 2025

(54) MOVING OBJECT

(71) Applicant: HONDA MOTOR CO., LTD., Tokyo (JP)

(72) Inventor: Yutaka Fukai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 606 days.

(21) Appl. No.: 17/941,606

(22) Filed: Sep. 9, 2022

(65) Prior Publication Data

US 2023/0099472 A1  Mar. 30, 2023

(30) Foreign Application Priority Data

Sep. 27, 2021 (JP) ................ 2021-157212

(51) Int. Cl.
*B60L 53/22* (2019.01)
*B60L 58/12* (2019.01)
*B60L 58/22* (2019.01)

(52) U.S. Cl.
CPC .............. *B60L 58/22* (2019.02); *B60L 58/12* (2019.02); *B60L 2240/54* (2013.01)

(58) Field of Classification Search
CPC ...... B60L 58/22; B60L 58/12; B60L 2240/54; B60L 3/0007; B60L 53/11; B60L 53/14; Y02E 60/10; Y02T 10/70; Y02T 10/7072
USPC ........................................ 320/130
See application file for complete search history.

(56) References Cited

U.S. PATENT DOCUMENTS

| | | |
|---|---|---|
| 2014/0055094 A1 | 2/2014 | Takagi et al. |
| 2016/0159243 A1 | 6/2016 | Park |
| 2021/0221436 A1 | 7/2021 | Tsuyuzaki et al. |
| 2023/0322105 A1* | 10/2023 | Plum ............... B60L 53/22 320/109 |

FOREIGN PATENT DOCUMENTS

| | | |
|---|---|---|
| CN | 103518303 A | 1/2014 |
| CN | 104908606 A | 9/2015 |
| CN | 105680104 A | 6/2016 |
| CN | 106183849 A | 12/2016 |
| CN | 106956599 A | 7/2017 |
| JP | 2018-193026 A | 12/2018 |

OTHER PUBLICATIONS

Feb. 28, 2025, Translation of Chinese Office Action issued for related CN Application No. 202211140554.2.

* cited by examiner

*Primary Examiner* — Paul Dinh
(74) *Attorney, Agent, or Firm* — Paratus Law Group, PLLC

(57) ABSTRACT

A moving object includes: a first battery module and a second battery module, each of which includes a plurality of battery cells laminated in a first direction; a battery case configured to house the first and the second battery modules; a charger configured to charge the first and the second battery modules; a load; and a battery controller configured to control the first and the second battery modules. The first and the second battery modules are arranged in the first direction. The first and the second battery modules are electrically connected in parallel to the charger and the load. When one of the first and the second battery modules is being charged, the battery controller prohibits charge of the other of the first and the second battery modules.

11 Claims, 9 Drawing Sheets

FIG. 7

| SECOND BATTERY MODULE | FIRST BATTERY MODULE | SECOND BATTERY MODULE | FIRST BATTERY MODULE | SECOND BATTERY MODULE | FIRST BATTERY MODULE |
|---|---|---|---|---|---|
| SOC = 75% | SOC = 75% | SOC = 100% | SOC = 50% | SOC = 50% | SOC = 50% |

FIG. 9
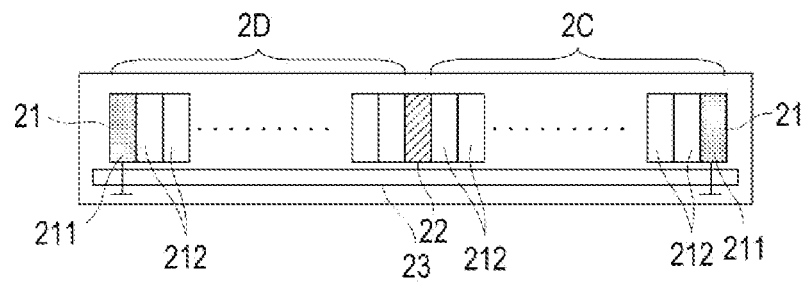
FIG. 10
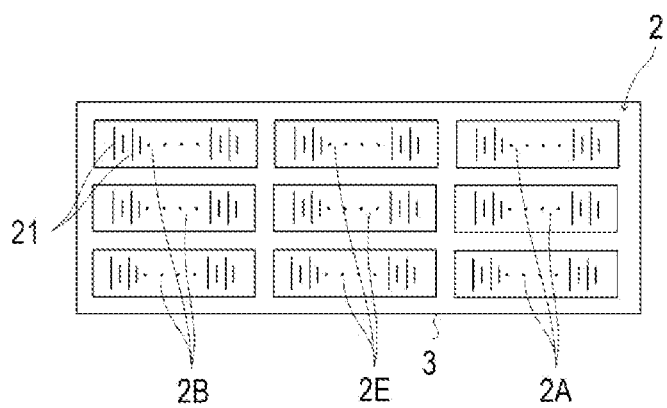
FIG. 11
| SECOND BATTERY MODULE | FIRST BATTERY MODULE | SECOND BATTERY MODULE | FIRST BATTERY MODULE | SECOND BATTERY MODULE | FIRST BATTERY MODULE |
|---|---|---|---|---|---|
| SOC = 75% | SOC = 75% | SOC = 100% | SOC = 100% | SOC = 75% | SOC = 75% |

MOVING OBJECT

CROSS-REFERENCE TO RELATED APPLICATION

This application is based on and claims priority under 35 USC § 119 from Japanese Patent Application No. 2021-157212, filed on Sep. 27, 2021, the entire contents of which are incorporated herein by reference.

TECHNICAL FIELD

The present disclosure relates to a moving object.

BACKGROUND

In recent years, the realization of a low-carbon or decarbonized economy has been called for to tackle global climate change. Reducing $CO_2$ emissions from moving objects, such as vehicles, electrification of drive sources has been rapidly promoted. Specifically, vehicles, such as electric vehicles and hybrid electric vehicles, including an electric motor as a drive source and a rechargeable battery configured to supply electricity to the electric motor have been developed.

In order to increase cruising range in such vehicles in recent years, battery packs are getting larger (see JP2018-193026A for example) and are getting denser with battery cells or battery modules.

Battery cells expand or shrink according to their state of charge (SoC). Therefore, a battery module expands when charged and shrinks when discharged. In particular, this is intense in all-solid-state batteries, which include solid electrolytes.

Therefore, it is necessary to keep a battery module sufficiently apart from walls of a battery case when the battery module is put into the battery case, which can decrease density of battery cells or battery modules in the battery case.

The present disclosure provides a moving object that can preserve the density of battery cells or battery modules in a battery case.

SUMMARY

A moving object according to an aspect of the present disclosure includes: a first battery module and a second battery module, each of which includes a plurality of battery cells laminated in a first direction; a battery case configured to house the first and the second battery modules; a charger configured to charge the first and the second battery modules; a load; and a battery controller configured to control the first and the second battery modules. The first and the second battery modules are arranged in the first direction. The first and the second battery modules are electrically connected in parallel to the charger and the load. When one of the first and the second battery modules is being charged, the battery controller prohibits charge of the other of the first and the second battery modules.

A moving object according to another aspect of the present disclosure includes: a battery case configured to house a plurality of battery cells laminated in a first direction; a charger configured to charge the plurality of battery cells; a load; and a battery controller configured to control the plurality of battery cells. The plurality of battery cells include: a first battery cell group placed in a first region; and a second battery cell group placed in a second region, which is adjacent to the first region in the first direction. The first and the second battery cell groups are electrically connected in parallel to the charger and the load. When one of the first and the second battery cell groups is being charged, the battery controller prohibits charge of the other of the first and the second battery cell groups.

A moving object according to another aspect of the present disclosure includes: at least three battery modules, each of which includes a plurality of battery cells laminated in a first direction; a battery case that configured to house the at least three battery modules; a charger configured to charge the at least three battery modules; a load; and a battery controller configured to control the at least three battery modules. The at least three battery modules are arranged in the first direction. The at least three battery modules are electrically connected in parallel to the charger and the load. When some of the at least three battery modules are being charged, the battery controller causes at least one of the other of the at least three battery modules to be discharged.

According to the present disclosure, it is possible to preserve the density of battery cells or battery modules in a battery case.

BRIEF DESCRIPTION OF DRAWINGS

Exemplary embodiments of the present disclosure will be described in detail based on the following figures, wherein:

FIG. 7 shows a relation of state of charge of the first battery modules 2A and the second battery modules 2B to clearance in a battery case 3;

FIG. 9 is a schematic front view of an internal structure of the battery case 3 of the moving object 1 shown in FIG. 8;

FIG. 10 is a block circuit diagram showing a schematic configuration of the moving object 1 according to a second modification; and FIG. 11 shows a relation of state of charge of batteries to clearance in a battery case according to a conventional configuration.

DESCRIPTION OF EMBODIMENTS

In the following, a moving object according to an embodiment of the present disclosure will be described with reference to FIGS. 1 to 7.

Figure 1:
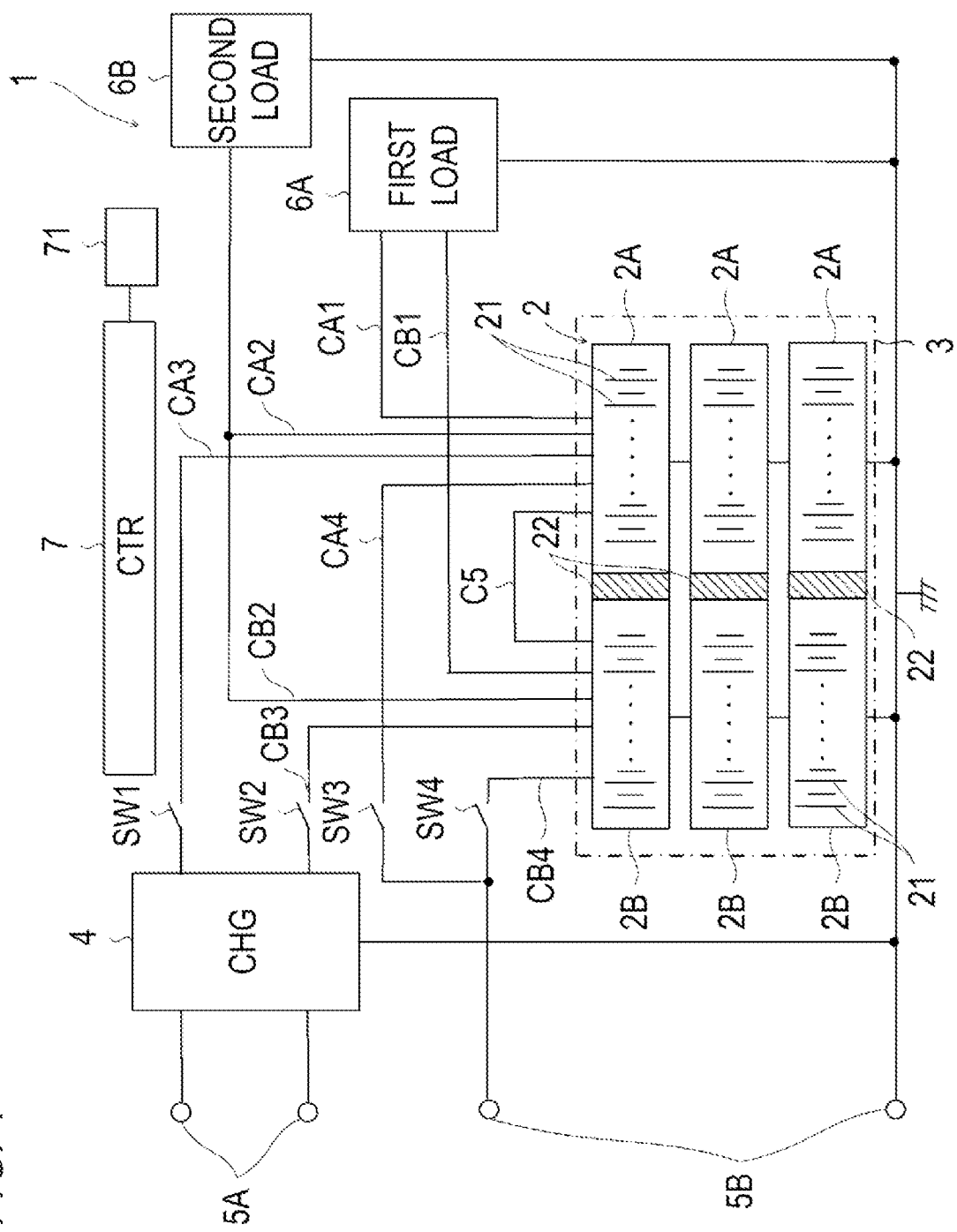
FIG. 1 is a block circuit diagram showing a schematic configuration of a moving object 1 according to an embodiment of the present disclosure.

As shown in FIG. 1, a moving object according to an embodiment of the present disclosure is, for example, an electrically powered vehicle with a motor and includes: a plurality of battery modules 2; a battery case 3; a charger 4; normal charging terminals 5A; quick charging terminals 5B; a first load 6A; a second load 6B, and a battery controller 7. The battery modules 2 includes: one or more (three, in the present embodiment) first battery modules 2A, which are electrically connected in series; and one or more (three, in the present embodiment) second battery modules 2B, which are electrically connected in series.

The battery modules 2, that is, three first battery modules 2A and three second battery modules 2B in the present embodiment are housed in the battery case 3. The number of the first battery modules 2A or the second battery modules 2B may be one or two or may be four or more.

Each of the battery modules 2 includes a plurality of battery cells 21, which are laminated in a first direction. The first battery modules 2A and the second battery modules 2B are arranged in a row in the first direction. The length of each of the battery modules 2 in the first direction increases when the battery cells 21 expand and decreases when the battery cells 21 shrink.

The first battery modules 2A and the second battery modules 2B are electrically connected in parallel to the first load 6A, the second load 6B, the charger 4, and the quick charging terminals 5B.

Specifically, the first battery modules 2A are electrically connected to: the first load 6A via a line CA1; the second load 6B via a line CA2; the charger 4 via a line CA3, in which a first switch SW1 is interposed; and the quick charging terminals 5B via a line CA4, in which a third switch SW3 is interposed. The second battery modules 2B are electrically connected to: the first load 6A via a line CB1; the second load 6B via a line CB2; the charger 4 via a line CB3, in which a second switch SW2 is interposed; and the quick charging terminals 5B via a line CB4, in which a fourth switch SW4 is interposed. The first battery modules 2A and the second battery modules 2B are connected to each other by a line C5.

In the present embodiment, each of the battery modules 2 is, for example, an all-solid-state battery. All-solid-state batteries include: an anode; a cathode; and a solid electrolyte provided between the anode and the cathode. They are charged or discharged by exchanging lithium ions between the anode and the cathode via the solid electrolyte. Any materials can be used as the solid electrolyte as long as they have lithium-ion conductivity and electrical non-conductivity. For example, the following can be used as the solid electrolyte: materials used in all-solid-state lithium-ion batteries; inorganic solid electrolyte materials such as sulfide solid electrolyte materials, oxide solid electrolyte materials, and lithium-containing salts; polymer-based solid electrolyte materials such as polyethylene oxide; and gel-based solid electrolytes with lithium-containing salts or ionic liquids having lithium-ion conductivity. The solid electrolyte may be granular.

As shown in FIG. 1, it is preferable that an elastic material 22 be provided between the first battery module 2A and the second battery module 2B that are arranged abreast in the first direction in the battery case 3. The elastic body 22 can hold the first battery module 2A and the second battery module 2B even when they expand or shrink in the first direction during charge or discharge.

Clearance is provided between the battery case 3 and each of the battery modules 2. The clearance in the first direction is set in consideration of the expansion and shrinkage of the battery modules 2.

If the clearance in the first direction is appropriately set when SoC of the battery modules 2 is 75% (see the left in FIG. 11), the battery modules 2, which expand considerably during charge, will touch the battery case 3 when the SoC becomes 100% (see the center in FIG. 11). Therefore, considerable clearance in the first direction is conventionally provided to the detriment of density of the battery modules 2 in the battery case 3 (see the right in FIG. 11). In the present disclosure, the clearance in the first direction is successfully provided without detriment to the density of the battery modules 2 in the battery case 3.

The charger 4 is built into the moving object 1 and is configured to charge the battery modules 2 by converting AC 100 V of a home power source connected to the normal charging terminals 5A into a predetermined DC voltage. The first battery modules 2A or the second battery modules 2B can be charged by switching the first switch SW1 or the second switch SW2.

The quick charger 100 (see FIG. 4) is connectable to the moving object 1 via the quick charging terminals 5B and is configured to charge the battery modules 2. The first battery modules 2A or the second battery modules 2B can be charged by switching the third switch SW3 and the fourth switch SW4.

The first load 6A is, for example, a motor configured to drive the moving object 1. The second load 6B is, for example, an air conditioner, an acoustic equipment, a lamp, or the like of the moving object 1.

The battery controller 7 is configured to control the charge and the discharge of the battery modules 2, thereby controlling the expansion and shrinkage of the battery modules 2. In the following, how the clearance is successfully provided without detriment to the density in the present disclosure will be described with reference to FIGS. 2 to 7.

Figure 2:
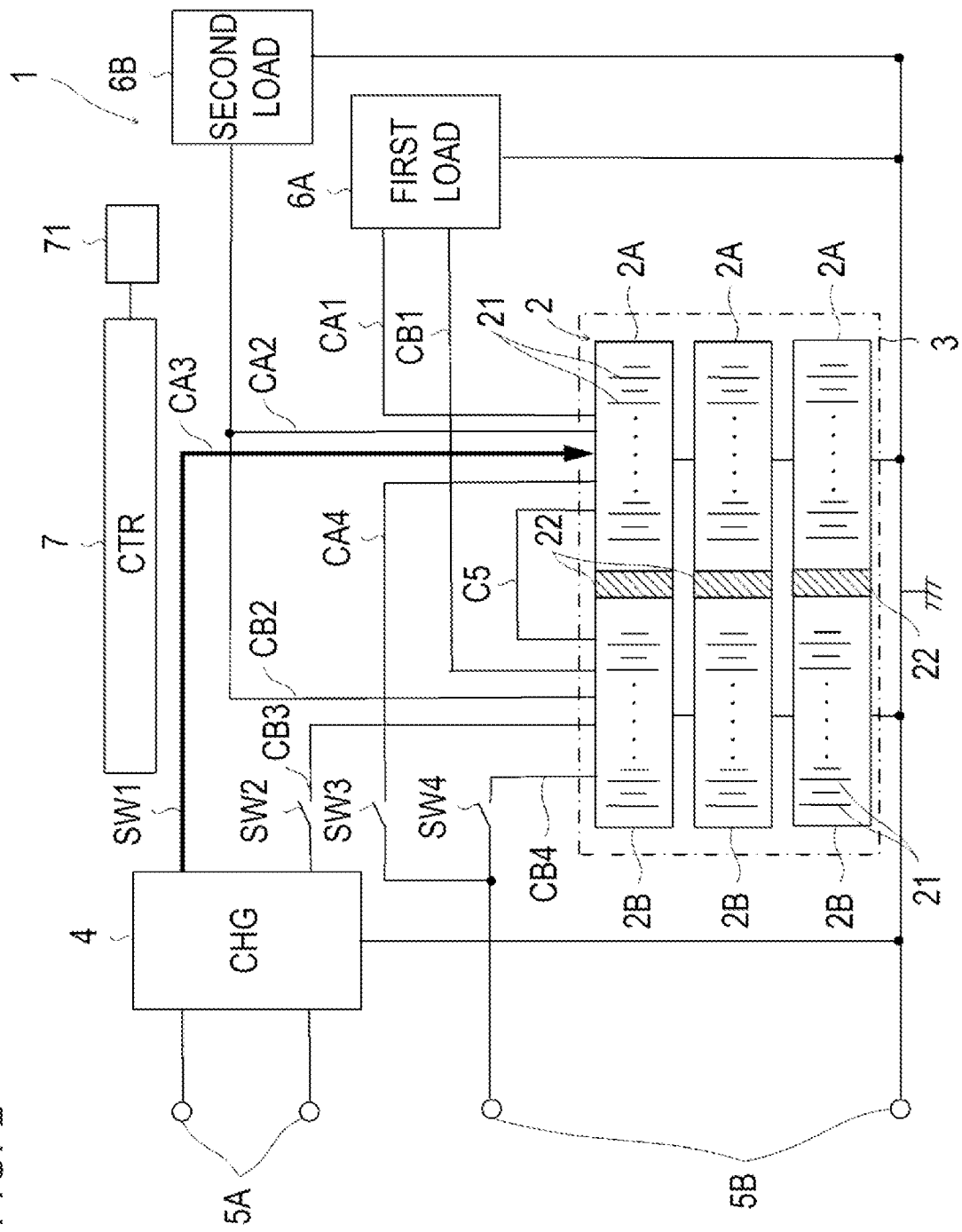
FIG. 2 is a block circuit diagram of the moving object 1 in which first battery modules 2A are being charged by a charger 4.

When the first battery modules 2A/the second battery modules 2B are being charged by the charger 4, the battery controller 7 prohibits the charge of the second battery modules 2B/the first battery modules 2A. Specifically, as shown in FIG. 2, when the first battery modules 2A are being charged, the battery controller 7 prohibits the charge of the second battery modules 2B. In this case, the first battery modules 2A may expand but the second battery modules 2B do not.

Since the expansion of the first battery modules 2A or the second battery modules 2B in the first direction is prevented, it becomes possible to provide the clearance between the battery modules 2 and the battery case 3 in the first direction without detriment to the density of the battery modules 2 in the battery case 3. Such control is effective especially for all-solid-state batteries, which expand considerably during charge.

Figure 3:
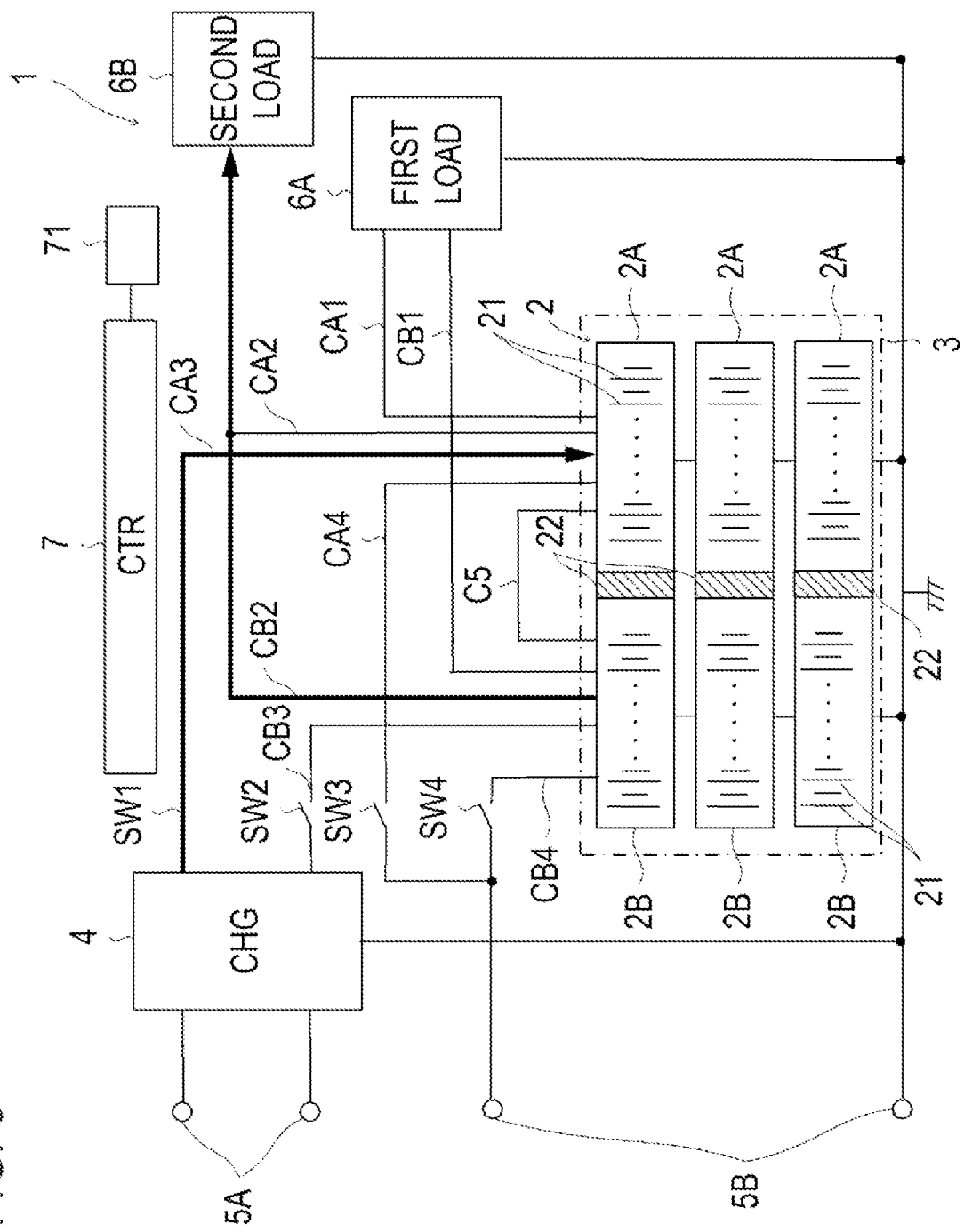
FIG. 3 is a block circuit diagram of the moving object 1 in which the first battery modules 2A are being charged by the charger 4 and second battery modules 2B are being discharged into a second load 6B.

It is preferable that the battery controller 7 cause the first battery modules 2A/the second battery modules 2B to be discharged when the second battery modules 2B/the first battery modules 2A are being charged by the charger 4. Specifically, as shown in FIG. 3, when the first battery modules 2A are being charged by the charger 4, it is preferable that the battery controller 7 cause the second battery modules 213 to be discharged into the second load 6B. In this case, the first battery modules 2A may expand but the second battery modules 2B shrink. Therefore, it becomes possible to provide the clearance without detriment to the density further.

Figure 4:
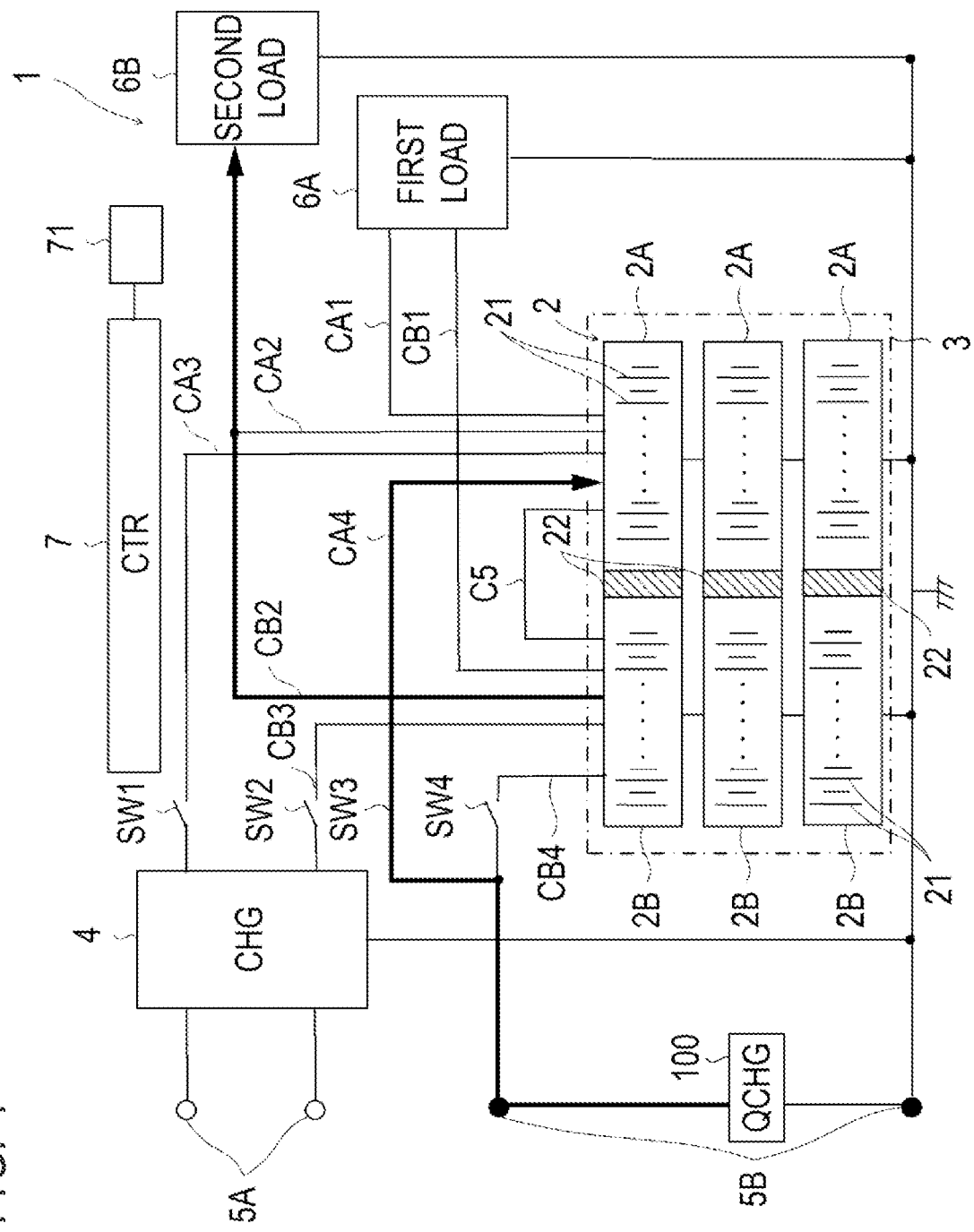
FIG. 4 is a block circuit diagram of the moving object 1 in which the first battery modules 2A are being charged by a quick charger 100 and the second battery modules 2B are being discharged into the second load 6B.

It is preferable that the battery controller 7 cause the first battery modules 2A/the second battery modules 2B to be discharged when the second battery modules 2B/the first battery modules 2A are being charged by the quick charger 100. Specifically, as shown in FIG. 4, when the first battery modules 2A are being charged by the quick charger 100, it is preferable that the controller 7 cause the second battery modules 2B to be discharged into the second load 6B. In this case, the first battery modules 2A may expand but the second battery modules 2B shrink. Therefore, it becomes possible to provide the clearance without detriment to the density further.

Figure 5:
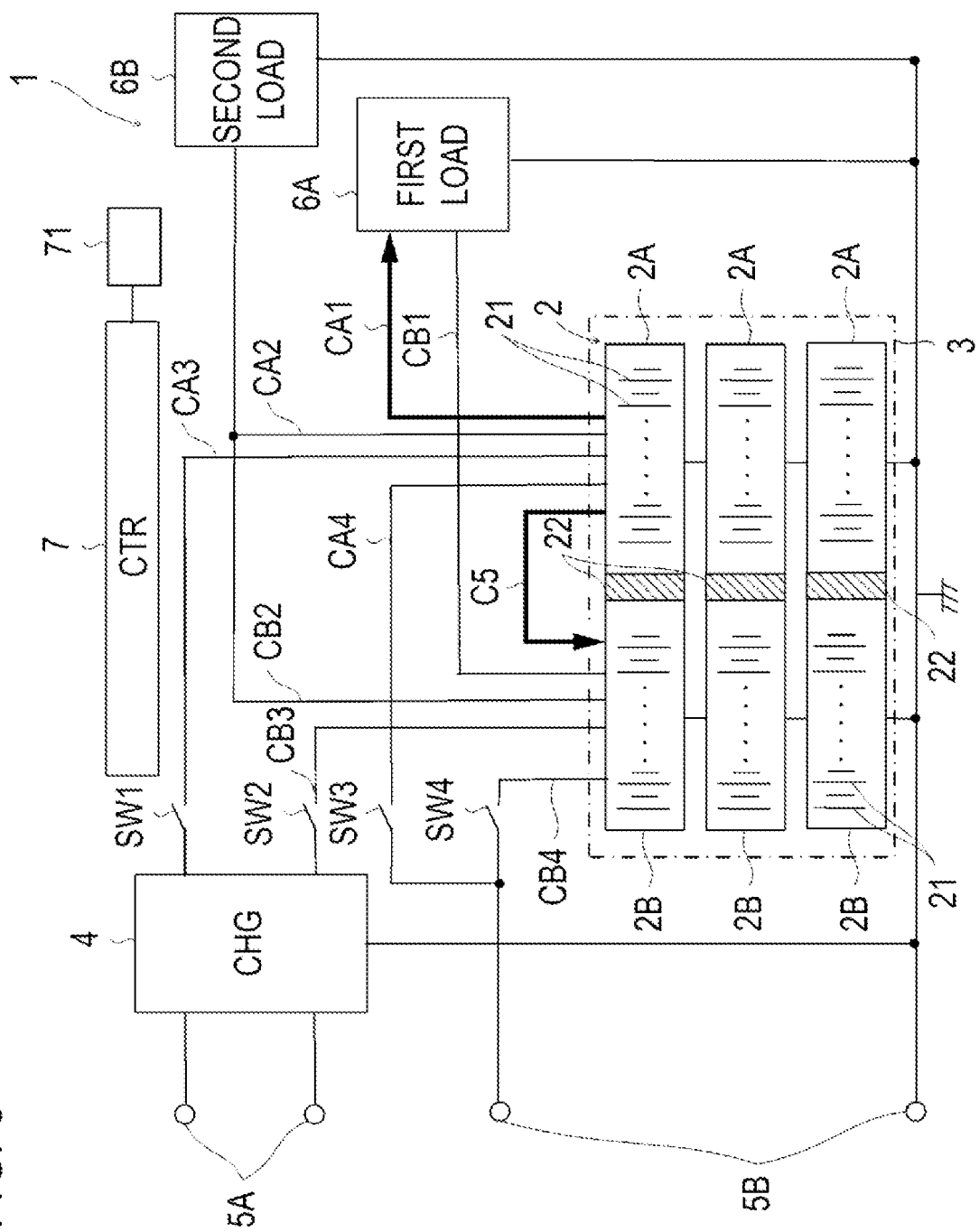
FIG. 5 is a block circuit diagram of the moving object 1 in which the first battery modules 2A are being discharged into a first load 6A and the second battery modules 2B are being charged by the first battery modules 2A.

It is preferable that the battery controller 7 cause the first battery modules 2A/the second battery modules 2B to be charged by the second battery modules 2B/the first battery modules 2A via the line C5 when the second battery modules 2B/the first battery modules 2A are being discharged (for example, when the moving object 1 is traveling). Specifically, as shown in FIG. 5, when the first battery modules 2A are being discharged into the first load 6A (for example, when the moving object 1 is traveling), it is preferable that the controller 7 cause the second battery modules 2B to be charged by the first battery modules 2A via the line C5. In this case, the shrinkage of the first battery modules 2A, which can adversely affect fixation of the battery modules 2, can be offset by the expansion of the second battery modules 2B.

Figure 6:
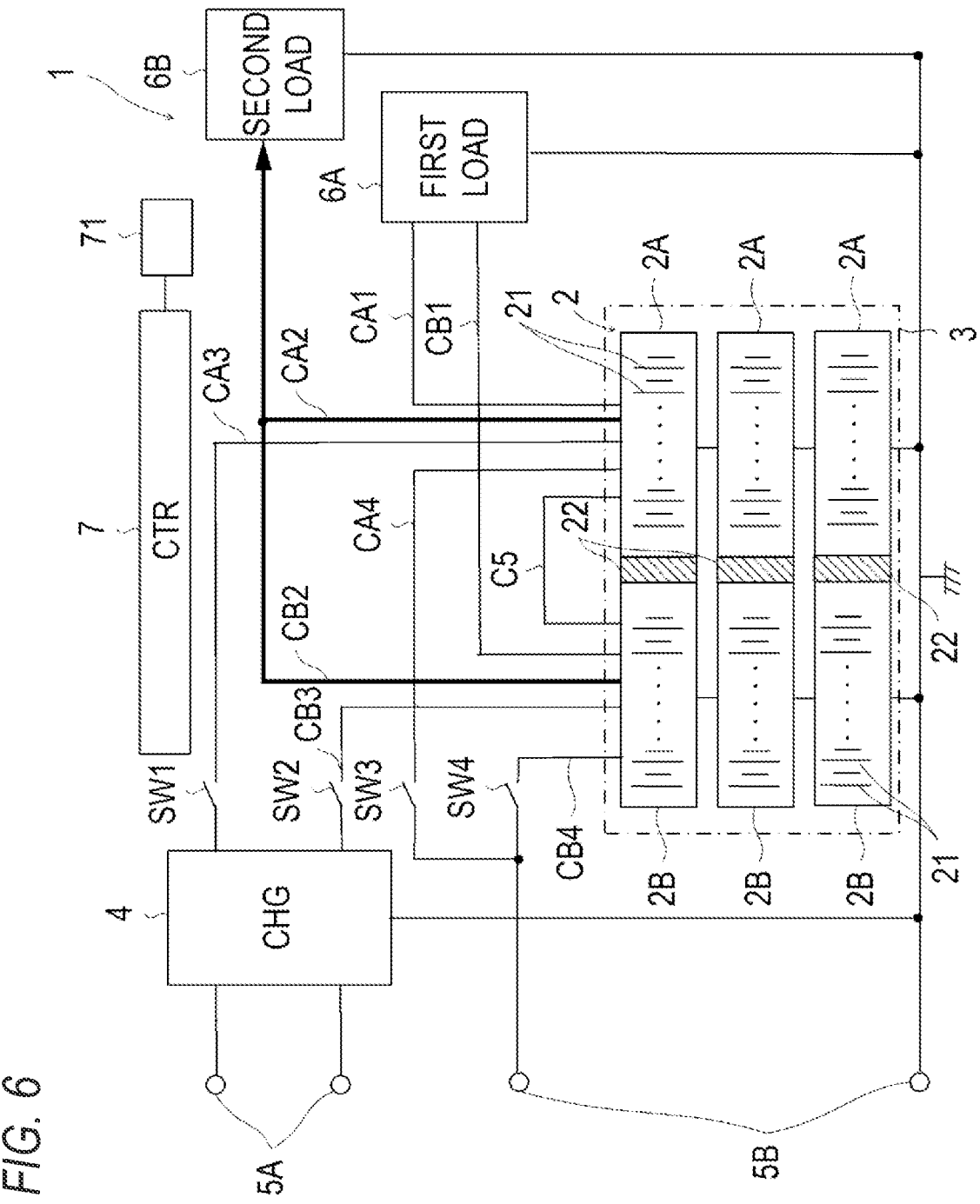
FIG. 6 is a block circuit diagram of the moving object 1 in which the first battery modules 2A and the second battery modules 2B are being discharged into the second load 6B when it is detected that the moving object 1 has crashed or predicted that the moving object 1 will crash.

As shown in FIG. 1, the moving object 1 may include a sensor 71 configured to detect that the moving object 1 has crashed or to predict that the moving object 1 will crash. As shown in FIG. 6, when the sensor 71 detects that the moving object 1 has crashed or predicts that the moving object 1 will crash, it is preferable that the controller 7 cause the first battery modules 2A and the second battery modules 2B to be discharged into the second load 6B. In this case, the battery modules 2 shrink during or before the collision. Therefore, the clearance increases, and stress on the battery modules 2 decreases.

It is preferable that the battery controller 7 be configured to monitor SoC of the first battery modules 2A and the second battery modules 2B, to estimate the expansion or shrinkage of the first battery modules 2A and the second battery modules 2B based on the SoC, and to control the charge and the discharge of the first battery modules 2A and the second battery modules 2B based on the estimated expansion or shrinkage.

For example, as shown in FIG. 7, the battery controller 7 may maintain sum of the SoC of the first battery modules 2A and that of the second battery modules 2B below a predetermined value (for example, 150%). In this case, the SoC of the first battery modules 2A and that of the second battery modules 2B may be, respectively, 75% and 75% (see the left in FIG. 7), 100% and 50% (see the center in FIG. 7), 50% and 50% (see the right in FIG. 7), or the like. It becomes possible to forestall excessive stress on the battery modules 2 by increasing the clearance in this manner.

First Modification

Next, a first modification of the above embodiment will be described with reference to FIGS. 8 and 9. In the following, reference numerals common to the embodiments refer to similar configuration for the sake of simplicity.

Figure 8:
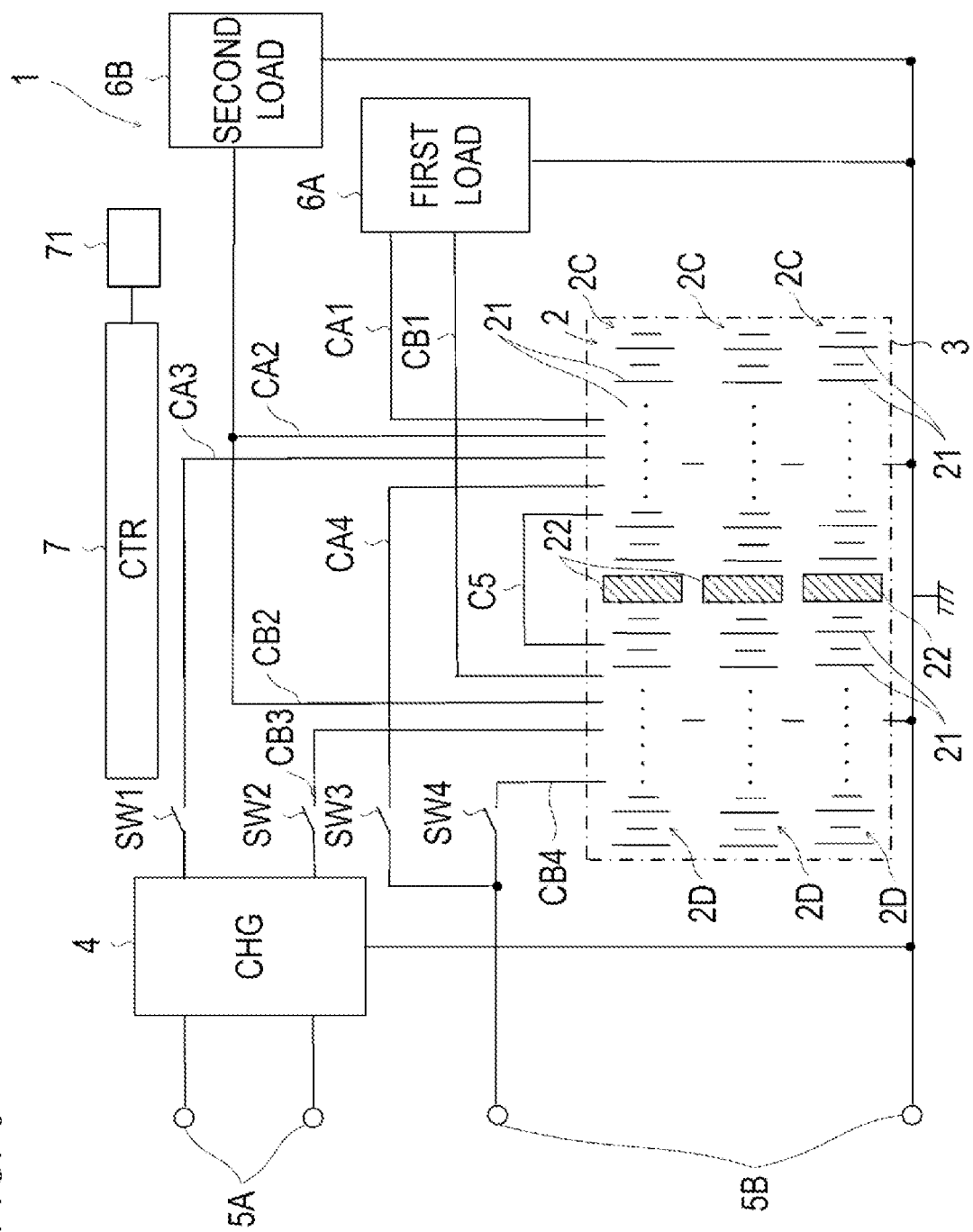
FIG. 8 is a block circuit diagram showing a schematic configuration of the moving object 1 according to a first modification.

As shown in FIG. 8, a battery case 3 according to the present embodiment is configured to house not battery modules but a plurality of battery cells laminated in a first direction. The battery cells include a first battery cell group 2C and a second battery cell group 2D. The first battery cell group 2C is placed in a first region, and the second battery cell group 2D is placed in a second region. The first and the second region is are adjacent to each other in the first direction. Similarly to the first battery modules 2A and the second battery modules 2B according to the above embodiment, the first battery cell group 2C and the second battery cell group 2D are electrically connected in parallel to the charger 4 and the loads 6A and 6B.

As shown in FIG. 9, battery cells 211 of the battery cells 21 that are at both ends in the first direction are fixed to a lower plate 23, which is fixed to the bottom of the battery case 3. The other battery cells 212 of the battery cells 21 are slidable in the first direction with respect to the lower plate 23, Therefore, stress on the battery cells 21 can be reduced even when the battery cells 21 expand or shrink. It is preferable that the elastic material 22 be provided between the first battery cell group 2C and the second battery cell group 2D.

When the first battery cell group 2C/the second battery cell group 2D is being charged, the battery controller 7 prohibits charge of the second battery cell group 2D/the first battery cell group 2C. Therefore, it becomes possible to provide clearance between the battery cells 21 and the battery case 3 without detriment to density of the battery cells 21 in the battery case 3.

Second Modification

Next, a second modification of the above embodiment will be described with reference to FIG. 10.

The first battery modules 2A and the second battery modules 2B are arranged in the first direction in the above embodiment; whereas the first battery modules 2A, the second battery modules 2B, and a third battery modules 2E are arranged in the first direction in the present embodiment.

The battery modules 2 according to the present embodiment include: a plurality of (for example, three) first battery modules 2A, which are electrically connected in series; a plurality of (for example, three) second battery modules 2B, which are electrically connected in series; and a plurality of (for example, three) third battery modules 2E, which are electrically connected in series. The number of the first battery modules 2A, the second battery modules 2B, or the third battery modules 2E may be one or two or may be four or more.

The first battery modules 2A, the second battery modules 2B, and the third battery modules 2E are electrically connected in parallel to the first load 6A, the second load 6B, the charger 4, and the quick charging terminals 5B. When some of the three battery modules 2A, 2B, 2E are being charged, it is preferable that the battery controller 7 cause some of the other battery modules 2A, 2B, 2E to be discharged. In this case, it becomes possible to provide clearance between the battery modules 2 and the battery case 3 without detriment to density of the battery modules 2 in the battery case 3. The battery modules 2 may further include other battery modules.

Although some embodiments have been described above with reference to the drawings, it goes without saying that the present disclosure is not limited thereto. It will be apparent to those skilled in the art that various changes or modifications may be conceived within the scope of the claims or the technical scope of the present disclosure. Components in the embodiments may be combined arbitrarily within the gist of the present disclosure.

For example, the present disclosure can be applied to not only all-solid-state batteries but also rechargeable batteries including electrolytic solutions.

At least the following are described in the present disclosure. Although corresponding components or the like are shown in parentheses, the present disclosure is not limited thereto.

(1) A moving object (object), including:
- a first battery module (the first battery modules 2A) and a second battery module (the second battery modules 2B), each of which includes a plurality of battery cells (21) laminated in a first direction;
- a battery case (3) configured to house the first and the second battery modules;
- a charger (4) configured to charge the first and the second battery modules;
- a load (6A); and
- a battery controller (7) configured to control the first and the second battery modules, in which
- the first and the second battery modules are arranged in the first direction,
- the first and the second battery modules are electrically connected in parallel to the charger and the load, and,
- when one of the first and the second battery modules is being charged, the battery controller prohibits charge of the other of the first and the second battery modules.

According to (1), by prohibiting the charge of the other of the first and the second battery modules when the one of the first and the second battery modules is being charged, it becomes possible to reduce expansion of the first and the second battery modules in the first direction during the charge of the first and the second battery modules. Therefore, it becomes possible to provide clearance between the first or the second battery module and the battery case without detriment to density of the first and the second battery modules in the battery case.

(2) The moving object according to (1), in which each of the first and the second battery modules includes a solid electrolyte.

According to (2), since all-solid-state batteries including the solid electrolyte expand considerably during the charge, it becomes possible to provide the clearance effectively without detriment to the density.

(3) The moving object according to (1) or (2), in which, when the one of the first and the second battery modules is being charged, the battery controller causes the other of the first and the second battery modules to be discharged.

According to (3), it becomes possible to reduce the expansion to provide the clearance without detriment to the density.

(4) The moving object according to (1) or (2), in which, when one of the first and the second battery modules is being discharged, the battery causes the one of the first and the second battery modules to charge the other of the first and the second battery modules.

According to (4), it becomes possible to reduce shrinkage of the first or the second battery module, which can adversely affect fixation of the first and the second battery modules.

(5) The moving object according to any one of (1)) to (4), in which
an elastic material (22) is provided between the first and the second battery modules.

According to (5), fixation of the first and the second battery modules can be maintained by the elastic material.

(6) The moving object according to any one of (1) to (5), further including:
- a sensor (71) configured to detect that the moving object has crashed or predict that the moving object will crash, in which,
- when it is detected that the moving object has crashed or it is predicted that the moving object will crash, the battery controller causes the first and the second battery modules to be discharged.

According to (6), it becomes possible to reduce stress on the first and the second battery modules during or before collision.

(7) The moving object according to any one of (1) to (6), in which
the battery controller is configured to monitor state of charge of the first and the second battery modules and to control charge and discharge of the first and the second battery modules based on the state of charge.

According to (7), it becomes possible to estimate expansion and shrinkage of the first and the second battery modules by monitoring the state of charge.

(8) The moving object according to (7), in which
the battery controller is configured to maintain a sum of the state of charge of the first battery module and that of the second battery module below a predetermined value.

According to (8), it becomes possible to forestall excessive stress on the first and the second battery modules.

(9) The moving object according to any one of (1) to (8), in which
- the moving object is connectable to a quick charger (100) provided outside the moving object, and,
- when one of the first and the second battery modules is being charged by the quick charger, the battery controller causes the other of the first and the second battery modules to be discharged.

According to (9), it becomes possible to reduce the expansion to provide the clearance without detriment to the density.

(10) A moving object (1), including:
- a battery case (3) configured to house a plurality of battery cells (21) laminated in a first direction;
- a charger (4) configured to charge the plurality of battery cells;
- a load (6A); and
- a battery controller (7) configured to control the plurality of battery cells, in which
- the plurality of battery cells include:
  - a first battery cell group (the first battery cell group 2C) placed in a first region; and
  - a second battery cell group (the second battery cell group 2D) placed in a second region, which is adjacent to the first region in the first direction,
- the first and the second battery cell groups are electrically connected in parallel to the charger and the load, and,
- when one of the first and the second battery cell groups is being charged, the battery controller prohibits charge of the other of the first and the second battery cell groups.

According to (10), by prohibiting the charge of the other of the first and the second battery cell groups when the one of the first and the battery cell groups is being charged, it becomes possible to reduce expansion of the first and the second battery cell groups in the first direction during the charge of the first and the second battery cell groups. Therefore, it becomes possible to provide clearance between the first or the second battery cell group and the battery case without detriment to density of the first and the second battery cell groups in the battery case.

(11) A moving object (the moving object 1), including:
at least three battery modules (the first battery modules 2A, the second battery modules 2B, and the third battery modules 2E), each of which includes a plurality of battery cells (21) laminated in a first direction;
a battery case (3) configured to house the at least three battery modules;
a charger (4) configured to charge the at least three battery modules
a load (6A); and
a battery controller (7) configured to control the at least three battery modules, in which
the at least three battery modules are arranged in the first direction,
the at least three battery modules are electrically connected in parallel to the charger and the load, and
when some of the at least three battery modules are being charged, the battery controller causes at least one of the other of the at least three battery modules to be discharged.

According to (11), by discharging at least one of the other of the at least three battery modules when some of the at least three battery modules are being charged, it becomes possible to reduce expansion of the at least three battery modules in the first direction during the charge of the at least three battery modules. Therefore, it becomes possible to provide clearance between the at least three battery modules and the battery case without detriment to density of the at least three battery modules in the battery case.

The invention claimed is:

1. A moving object, comprising:
a first battery module and a second battery module, each of which includes a plurality of battery cells laminated in a first direction;
a battery case configured to house the first and the second battery modules;
a charger configured to charge the first and the second battery modules;
a load; and
a battery controller configured to control the first and the second battery modules, wherein
the first and the second battery modules are arranged in the first direction,
the first and the second battery modules are electrically connected in parallel to the charger and the load, and
when one of the first and the second battery modules is being charged, the battery controller prohibits charge of the other of the first and the second battery modules.

2. The moving object according to claim 1, wherein
each of the first and the second battery modules includes a solid electrolyte.

3. The moving object according to claim 1, wherein,
when the one of the first and the second battery modules is being charged, the battery controller causes the other of the first and the second battery modules to be discharged.

4. The moving object according to claim 1, wherein,
when one of the first and the second battery modules is being discharged, the battery causes the one of the first and the second battery modules to charge the other of the first and the second battery modules.

5. The moving object according to claim 1, wherein
an elastic material is provided between the first and the second battery modules.

6. The moving object according to claim 1, further comprising:
a sensor configured to detect that the moving object has crashed or predict that the moving object will crash, wherein,
when it is detected that the moving object has crashed or it is predicted that the moving object will crash, the battery controller causes the first and the second battery modules to be discharged.

7. The moving object according to claim 1, wherein
the battery controller is configured to monitor state of charge of the first and the second battery modules and to control charge and discharge of the first and the second battery modules based on the state of charge.

8. The moving object according to claim 7, wherein
the battery controller is configured to maintain a sum of the state of charge of the first battery module and that of the second battery module below a predetermined value.

9. The moving object according to claim 1, wherein
the moving object is connectable to a quick charger provided outside the moving object, and,
when one of the first and the second battery modules is being charged by the quick charger, the battery controller causes the other of the first and the second battery modules to be discharged.

10. A moving object, comprising:
a battery case configured to house a plurality of battery cells laminated in a first direction;
a charger configured to charge the plurality of battery cells;
a load; and
a battery controller configured to control the plurality of battery cells, wherein
the plurality of battery cells include:
a first battery cell group placed in a first region; and
a second battery cell group placed in a second region, which is adjacent to the first region in the first direction,
the first and the second battery cell groups are electrically connected in parallel to the charger and the load, and,
when one of the first and the second battery cell groups is being charged, the battery controller prohibits charge of the other of the first and the second battery cell groups.

11. A moving object, comprising:
at least three battery modules, each of which includes a plurality of battery cells laminated in a first direction;
a battery case that configured to house the at least three battery modules;
a charger configured to charge the at least three battery modules;
a load; and
a battery controller configured to control the at least three battery modules, wherein
the at least three battery modules are arranged in the first direction,
the at least three battery modules are electrically connected in parallel to the charger and the load, and,
when some of the at least three battery modules are being charged, the battery controller causes at least one of the other of the at least three battery modules to be discharged.

* * * * *